(No Model.)
C. A. BUFFINGTON.
THILL COUPLING.
No. 496,774. Patented May 2, 1893.
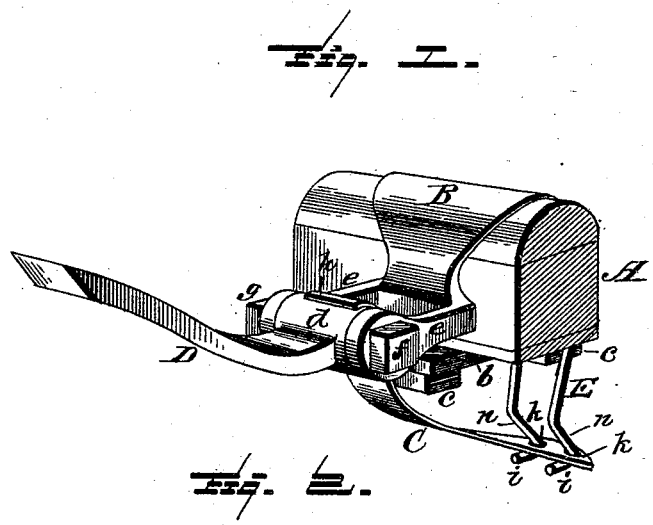
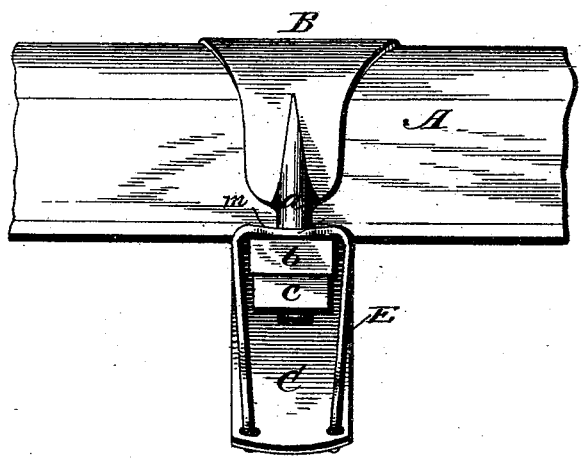
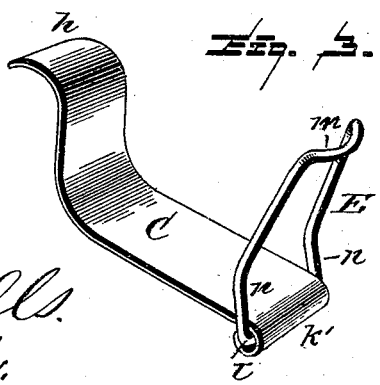
Witnesses
L. C. Hills.
E. A. Boud.
Inventor
Calvin A. Buffington
per Chas. N. Fowler
Attorney
THE NORRIS PETERS CO., PHOTO-LITHO., WASHINGTON, D. C.

United States Patent Office.

CALVIN ALLEN BUFFINGTON, OF BERKSHIRE, NEW YORK.

THILL-COUPLING.

SPECIFICATION forming part of Letters Patent No. 496,774, dated May 2, 1893.

Application filed December 30, 1892. Serial No. 456,738. (No model.)

*To all whom it may concern:*

Be it known that I, CALVIN ALLEN BUFFINGTON, a citizen of the United States, residing at Berkshire, in the county of Tioga and State of New York, have invented certain new and useful Improvements in Thill-Couplings; and I do hereby declare that the following is a full, clear, and exact description of the same, reference being had to the annexed drawings, making a part of this specification, and to the letters of reference marked thereon.

The present invention has relation to that class of thill-couplings provided with means for preventing any rattling thereof, and has for its object to provide an attachment that will effectually prevent any rattling of the coupling and at the same time capable of ready connection thereto, and the invention consists in an attachment constructed substantially as shown in the drawings and hereinafter described and claimed.

Figure 1 of the drawings represents a perspective view of a thill coupling with my improved anti-rattling device connected thereto; Fig. 2 a rear view thereof; Fig. 3 a detail view in perspective of the device showing a modification in the manner of connecting the loop to the spring.

In the accompanying drawings A represents the axle and B the usual clip provided with the usual screw threaded bolts $a$ for connecting thereto the clip-bar $b$ by means of the nuts $c$, all of which are of the ordinary construction.

The anti-rattling device consists of the flat spring C curved as shown to extend over and upon the eye $d$ of the usual thill-iron D, which latter is held between the forwardly projecting lugs $e$ by means of the bolt $f$ and nut $g$. The flat spring C is of sufficient length to extend down under and to the rear of the axle and has hinged to its rear end a wire loop E so that the loop can be swung forward or backward in connecting or disconnecting the loop from the coupling. After the spring C is in place, the loop E can be swung forward and sprung over the projecting end of the clip-bar $b$ which will securely hold the spring in place and effectually prevent any rattling of the coupling. The flat spring C has its outer end curved as shown at $h$ so that it will press downward upon the eye $d$ in a vertical direction, thus securing the full benefit of the spring action upon the thill iron and rendering the device more effective.

The loop may be connected to the end of the spring in any suitable manner so long as a hinge is formed between the two, either by forming hooks $i$ upon the free ends of the loop to enter holes $k$ in the end of the spring as shown in Figs. 1 and 2, or by forming an eye $k'$ in the end of the spring to receive the inwardly bent ends $l$ of the loop as shown in Fig. 3. Either manner of attaching the loop to the spring will form the desired hinge connection which is essential to the practical operation of the device, and any means of connecting the loop to the spring that will allow the loop to swing back or forth on the arc of a circle similar to the leaf of a hinge would come within the scope of my invention, and I reserve the right to make such change or modification in the manner of connecting the loop to the spring to effect the object sought without departing from the principle of the invention. The loop at its upper end has a curved bearing $m$ so as to embrace the bolt $a$ as shown in Fig. 2 and have a firmer bearing on the upper side of the clip-bar $b$ by increasing its bearing surface. The loop near its lower ends is formed with elbows $n$ so that the loop will be farther from the point of attachment to the spring and the strain thereon will not be in a direct line which would tend to straighten the hooked ends of the loop.

Having now fully described my invention, what I claim as new, and desire to secure by Letters Patent, is—

1. An anti-rattling device or attachment to thill-couplings, consisting of a flat curved spring, curved as shown to extend over and upon the eye of the thill-iron and down and under the axle, and a wire loop hinged to the rear end of the spring and adapted to extend over and bear upon the projecting end of the clip-bar or other part of the coupling, substantially as and for the purpose described.

2. An anti-rattling attachment to thill-couplings, consisting of a flat curved spring and a wire loop hinged thereto, said loop having at its outer or upper end a curved bearing, substantially as and for the purpose described.

3. An anti-rattling attachment to thill-couplings, consisting of a flat curved spring having holes at one end and a wire loop having hooked ends extending through the holes whereby a hinged connection is made between the spring and loop, substantially as and for the purpose specified.

In testimony that I claim the above I have hereunto subscribed my name in the presence of two witnesses.

CALVIN ALLEN BUFFINGTON.

Witnesses:
JOHN G. HARDENBERGH,
S. J. WALDO.